United States Patent
Inoue et al.

(10) Patent No.: US 10,469,308 B2
(45) Date of Patent: Nov. 5, 2019

(54) COMMUNICATION ADAPTER FOR COLLECTING INFORMATION ABOUT A SYSTEM BEING MONITORED

(71) Applicant: NORITZ CORPORATION, Hyogo (JP)

(72) Inventors: Tomoharu Inoue, Hyogo (JP);
Masayuki Sugioka, Hyogo (JP);
Yoshihiko Maekawa, Hyogo (JP);
Tsuyoshi Yamashita, Hyogo (JP);
Naoki Tawada, Hyogo (JP); Masaru Ono, Hyogo (JP)

(73) Assignee: NORITZ CORPORATION, Hyogo (JP)

( * ) Notice: Subject to any disclaimer, the term of this patent is extended or adjusted under 35 U.S.C. 154(b) by 0 days.

(21) Appl. No.: 15/766,110

(22) PCT Filed: Oct. 7, 2016

(86) PCT No.: PCT/JP2016/079885
§ 371 (c)(1),
(2) Date: Apr. 5, 2018

(87) PCT Pub. No.: WO2017/068996
PCT Pub. Date: Apr. 27, 2017

(65) Prior Publication Data
US 2018/0287857 A1 Oct. 4, 2018

(30) Foreign Application Priority Data
Oct. 19, 2015 (JP) .................................. 2015-205177

(51) Int. Cl.
*H04L 12/28* (2006.01)
*H04L 12/24* (2006.01)
*H04J 1/16* (2006.01)

(52) U.S. Cl.
CPC ...... *H04L 41/0631* (2013.01); *H04L 12/2816* (2013.01); *H04L 41/0677* (2013.01)

(58) Field of Classification Search
CPC ............ H04L 41/0631; H04L 41/0677; H04L 12/2816; H04L 12/2825; H04Q 2209/86
(Continued)

(56) References Cited

U.S. PATENT DOCUMENTS

2004/0203558 A1* 10/2004 Suzuki .................... H04L 45/28
455/403
2012/0185737 A1* 7/2012 Ishiou ................. G06F 11/0751
714/48
(Continued)

FOREIGN PATENT DOCUMENTS

JP         3603762 B2    12/2004
JP         3608492 B2     1/2005
(Continued)

OTHER PUBLICATIONS

International Search Report; issued in PCT/JP2016/079885; dated Dec. 27, 2016.

*Primary Examiner* — John Pezzlo
(74) *Attorney, Agent, or Firm* — Studebaker & Brackett PC

(57) ABSTRACT

A communication adapter for transmitting information about a system being monitored, such as a multi-water-heater system, to a remote management apparatus and collecting information about the system being monitored allows the location of an abnormality in communication to be easily identified even when the adapter is communicably connected to the remote management apparatus via a communication relay unit, thereby improving the reliability of the information collection process. The communication adapter 11 includes a function for detecting an abnormality in communication between the communication adapter 11 and
(Continued)

system being monitored 1, a function for detecting an abnormality in communication between the communication adapter 11 and communication relay unit 12, and a function for detecting an abnormality in communication between the communication relay unit 12 and remote management apparatus 6.

8 Claims, 3 Drawing Sheets

(58) Field of Classification Search
USPC .......................................... 370/216, 241, 386
See application file for complete search history.

(56) References Cited

U.S. PATENT DOCUMENTS

| 2015/0120006 | A1 | 4/2015 | Terashima et al. |
| 2016/0209059 | A1* | 7/2016 | Castillo ................. G05B 15/02 |
| 2016/0223997 | A1 | 8/2016 | Minezawa et al. |
| 2016/0285717 | A1* | 9/2016 | Kim .................... H04L 12/2803 |
| 2019/0066473 | A1* | 2/2019 | Laska .............. G08B 13/19682 |

FOREIGN PATENT DOCUMENTS

| JP | 2005-184481 A | 7/2005 |
| JP | 2005-184487 A | 7/2005 |
| JP | 2007-274710 A | 10/2007 |
| JP | 2010-118766 A | 5/2010 |
| JP | 2015-088894 A | 5/2015 |
| WO | 2015/071990 A1 | 5/2015 |

* cited by examiner

Fig. 2

■LIST OF ERRORS OCCURRING

| No. | SYSTEM ID | RECEPTION DATE/TIME | OCCURRENCE DATE/TIME | ERROR CODE | DETAILS OF FAILURE |
|---|---|---|---|---|---|
| E001 | R90210 | 2015-10-15 12:10:00 | 2015-10-15 09:32:01 | X60 | ABNORMALITY IN TWO-CORE WIRE COMMUNICATION |
| E002 | R90035 | 2015-10-15 12:11:00 | 2015-10-15 11:25:45 | X2 | WATER-HEATER FAILURE |
| E003 | R90801 | 2015-10-15 12:12:00 | 2015-10-15 12:05:32 | X0 | ABNORMALITY IN CHILD SC |

■LIST OF HOW ALL SYSTEMS ARE OPERATING

| SYSTEM ID | RECEPTION DATE/TIME | ... | ROUTER CONNECTION | ... |
|---|---|---|---|---|
| R90210 | 2015-10-15 12:10:00 | | ○ | |
| R90211 | 2015-10-15 12:10:00 | | × | |
| R90212 | 2015-10-15 10:10:00 | | ○ | |
| : | : | : | : | : |

COMMUNICATION ADAPTER FOR COLLECTING INFORMATION ABOUT A SYSTEM BEING MONITORED

TECHNICAL FIELD

The present invention relates to a communication adapter for collecting information about a system being monitored, such as a multi-water-heater system, in which a plurality of water heaters are connected to each other to enable large-output hot-water supply, and transmitting the information to a remote management apparatus.

BACKGROUND ART

In the field of business-use water-heater systems, multi-water-heater systems that use a plurality of instantaneous gas water heaters have recently been replacing water-heater systems that combine a boiler and a storage tank. A multi-water-heater system has various advantages: for example, when one water heater fails, the other water heaters can operate as a backup to continue supply of hot water; a special machine room is not necessary and it is relatively easy to bring in, carry out and replace component devices; nor are special engineers, such as boiler engineers, necessary, as one can operate the system only with simple remote-control operations.

The present applicant has developed such multi-water-heater systems and has disclosed some in Patent Documents 1 and 2, listed below, for example.

Further, Patent Document 3, also listed below, discloses a remote management system in which a relay adapter (communication relay unit) that works as a relay between heat source equipment and a management center is provided for transmitting various types of information about the heat source equipment to the management center and manages it remotely, where the relay adapter of the remote management system determines whether a communication abnormality is located between the heat source equipment and relay adapter or between the relay adapter and conversion transmission board and indicates the result of this determination on an LED indicator using various lighting modes (see Patent Document 3, paragraph 0098, and FIG. 9). Further, the relay adapter includes non-volatile memory that stores information associated with the heat source equipment obtained from the heat source equipment and, in response to a request from the management center, is capable of transmitting the information stored in the non-volatile memory to the management center.

The relay device (36) described in Patent Document 3 is a means for selecting the relay adapter (28) or microcomputer meter (42) to be connected to the conversion transmission board (38) (paragraph 0041) and thus is a switch means, rather than a relay for communications for transmission-protocol conversion, for example.

PRIOR ART DOCUMENTS

Patent Documents

Patent Document 1: Japanese Patent No. 3603762
Patent Document 2: Japanese Patent No. 3608492
Patent Document 3: JP 2007-274710 A

DISCLOSURE OF THE INVENTION

Problems to be Solved by the Invention

In the remote management system disclosed in Patent Document 3, the control unit incorporated in the heat source equipment is connected to the relay adapter, and this relay adapter may suitably be a router device provided by communication operators, to ensure the reliability of communication and reduce costs. In such cases, the connection ports on the router device are usually LAN ports, and a LAN communication substrate must be incorporated that is directed to the heat source equipment.

On the other hand, in multi-water-heater systems developed by the present applicant, a system controller is provided for managing the operation of a plurality of water heaters, and the connection ports on this system controller are two-core wire communication ports that enable communication with power-source superimposition.

As such, to connect the multi-water-heater system to the remote management center, a communication adapter that is separate from the above-discussed relay adapter must be provided for connecting the two-core wire communication ports on the system controller and the LAN ports on the router device. Further, a multi-water-heater system includes, for example, 24 water heaters at the most, which are connected with each other by a plurality of system controllers that are arranged in a hierarchical structure, resulting in a complicated connection between the various devices such as water heaters and system controllers; also, different facilities being constructed require different numbers of component water heaters and system controllers, resulting in different connection relationships, thus potentially causing connection errors between the devices during construction.

As such, if a communication adapter is provided between the relay adapter such as a router device and system controller, it cannot be determined whether a communication abnormality detected by the relay adapter between itself and the heat source equipment occurred between the relay adapter and communication adapter or between the communication adapter and system controller(s), such that considerable work and time is required to determine the location of the abnormality. Further, in arrangements where the relay adapter collects and stores information from the system controller(s), information collection becomes impossible when a communication abnormality occurs between the relay adapter and communication adapter or when a communication abnormality occurs between the communication adapter and system controller(s), which means decreased resistance to abnormalities.

In view of this, an object of the present invention is to provide a communication adapter for transmitting, to a remote management apparatus, information about a system being monitored such as a multi-water-heater system, where the location of a communication abnormality can be easily identified even in connection configurations where information about the system being monitored can be communicated to the remote management apparatus via a communication relay unit to improve the reliability of information collection. Another object of the present invention is to provide a remote management apparatus for remotely managing information about a system being monitored such as a multi-water-heater system, where the location of a communication abnormality can be easily identified even in implementations having a plurality of component devices on the communication path to the system being monitored.

Means for Solving the Problems

To achieve the above-identified objects, the present invention deploys the following technical means.

That is, in a communication adapter for collecting information about a system being monitored by communicating with the system being monitored and communicating with a remote management apparatus via a communication relay unit, the present invention features: a first abnormality detection means adapted to detect an abnormality in communication between the communication adapter and the system being monitored; a second abnormality detection means adapted to detect an abnormality in communication between the communication adapter and the communication relay unit; and a third abnormality detection means adapted to detect an abnormality in communication between the communication relay unit and the remote management apparatus.

The communication adapter of the present invention collects information about the system being monitored and transmits the collected information to the remote management apparatus via the communication relay unit, and thus the function of communicating with the remote management apparatus need not be incorporated in the system being monitored itself, thereby allowing information about an existing system being monitored to be managed by the remote management apparatus. Further, since the communication relay unit is provided between the communication adapter and remote management apparatus, the physical layer of communication between the communication relay unit and remote management apparatus may be, for example, wireless communication through a cell-phone network, the physical layer of communication between the communication relay unit and communication adapter may be, for example, 100BASE-TX communication, the physical layer of communication between the transmission adapter and system being monitored may be, for example, two-core wire communication, and the communication circuitry in and around the system being monitored may be existing two-core wire communication circuitry, where the communication relay unit may be a router device provided by wireless communication operators to relay communication. Further, since the communication relay unit is provided closer to the remote management apparatus than the communication adapter is, an abnormality in the communication relay unit does not affect communication between the communication adapter and system being monitored, thereby improving the usability of the entire system. Further, since the communication adapter includes the first to third abnormality detection means, when some communication abnormality occurs after installation of the communication adapter of the present invention, it is possible to determine whether the communication abnormality is an abnormality in communication between the communication adapter and system being monitored, or is an abnormality in communication between the communication adapter and communication relay unit, or is an abnormality in communication between the communication relay unit and remote management apparatus, thereby facilitating identification of the location of an abnormality.

Starting from the communication apparatus of the present invention described above, the third abnormality detection means may be adapted to detect the abnormality in communication between the communication relay unit and the remote management apparatus if a response by the communication relay unit to a data transmission request addressed to the remote management apparatus contains information indicating that abnormality in communication. In this case, when the communication relay unit detects an abnormality in communication between itself and the remote management apparatus, a response containing information indicating the abnormality may be forwarded to the communication adapter to allow the communication adapter to detect an abnormality in communication between the communication relay unit and remote management apparatus.

Further, a notifier may be provided for distinguishably indicating the abnormalities in communication detected by the first to third abnormality detection means. In this case, the contractor, repairer or user may be notified of the abnormalities in communication detected by the first to third abnormality detection means such that he can distinctly determine in which section the communication abnormality has occurred.

Further, the first abnormality detection means may be configured, when it detects the abnormality in communication between the communication adapter and the system being monitored, to transmit information indicating that that abnormality in communication has occurred to the remote management apparatus. In this case, even in a configuration where the remote management apparatus does not communicate with the system being monitored, the remote management apparatus may store and manage information indicating that an abnormality has occurred in communication between the communication adapter and the system being monitored.

Further, the present invention is directed to a remote management apparatus communicating with an information collector via a communication relay unit, the information collector collecting information about a system being monitored by communicating with the system being monitored, the remote management apparatus featuring: a first abnormality determination means adapted to determine whether an abnormality has occurred in communication between the information collector and the system being monitored; a second abnormality determination means adapted to determine whether an abnormality has occurred in communication between the information collector and the communication relay unit; and a third abnormality determination means adapted to determine whether an abnormality has occurred in communication between the communication relay unit and the remote management apparatus.

Since the remote management apparatus of the present invention includes the first to third abnormality determination means, when some abnormality in communication occurs, the remote management apparatus can determine whether the abnormality in communication is an abnormality in communication between the information collector and system being monitored, or is an abnormality in communication between the information collector and communication relay unit, or is an abnormality in communication between the communication relay unit and remote management apparatus, thereby facilitating remote identification of the location of an abnormality.

Starting from the remote management apparatus of the present invention described above, the first abnormality detection means may be configured, when it receives, from the information collector, information indicating that an abnormality has occurred in communication between the information collector and the system being monitored, to determine that an abnormality has occurred in communication between the information collector and the system being monitored. In this case, even in an arrangement where the remote management apparatus does not communicate with the system being monitored and communicates only with the information collector via the communication relay unit, the remote management apparatus can determine that an abnormality has occurred in communication between the information collector and system being monitored.

Further, the third abnormality determination means may be configured, if regular communication between itself and the communication relay unit is broken off, to determine that an abnormality has occurred in communication between the communication relay unit and the remote management apparatus. In this case, an abnormality in communication between the remote management apparatus and communication relay unit can be determined accurately. Such regular communication may be a regular request for communication by the remote management apparatus, such as a request for communication to check IP connection, in which case it is determined that communication has been broken off if it is determined that there is not response to the request for communication by the remote management apparatus. Further, regular communication may be a regular request for communication from the communication relay unit, in which case it is determined that communication has been broken off if it is determined that the absence of a request for communication from the communication relay unit has continued for a predetermined period of time or longer.

Further, the information collector may be configured to transmit predetermined information to the remote management apparatus each time a first predetermined time period (for example 60 minutes) passes, and the second abnormality determination means may be configured to determine that an abnormality has occurred in communication between the information collector and the communication relay unit if the third abnormality determination means has not determined whether there is an abnormality in communication and if no information has been received from the information collector for a second predetermined time period (for example 90 minutes), the second predetermined time period being longer than the first predetermined time period. In this case, it may be accurately determined whether an abnormality has occurred in communication between the information collector and communication relay unit, dealing separately with an abnormality in communication between the communication relay unit and remote management apparatus.

Further, a display terminal may further be provided for distinguishably displaying the abnormalities in communication determined by the first to third abnormality determination means. In this case, the administrator or maintenance operator, for example, may easily recognize that such abnormalities in communication has occurred by looking at the display terminal. The display terminal may be mounted on the remote management apparatus, or may be provided in a location remote from the remote management apparatus and connected thereto via a communication line, such as the Internet. Further, the display terminal may be a portable information terminal such as a notebook computer or a tablet terminal, in which case the terminal may be brought into the installation site for the communication apparatus of the present invention to check the information managed by the remote management apparatus.

The remote management apparatus of the present invention may not control or manage the operation of the system being monitored, and may remotely manage various types of information (such as system configuration information or operation history information) associated with the system being monitored collected from the system being monitored.

BRIEF DESCRIPTION OF THE DRAWINGS

FIG. 2 shows a display screen on the display terminal of the remote monitoring system, listing errors occurring in the entire multi-water-heater system and indicating how all systems are operating.

EMBODIMENTS FOR CARRYING OUT THE INVENTION

Embodiments of the present invention will now be described with reference to the drawings.

Figure 1:
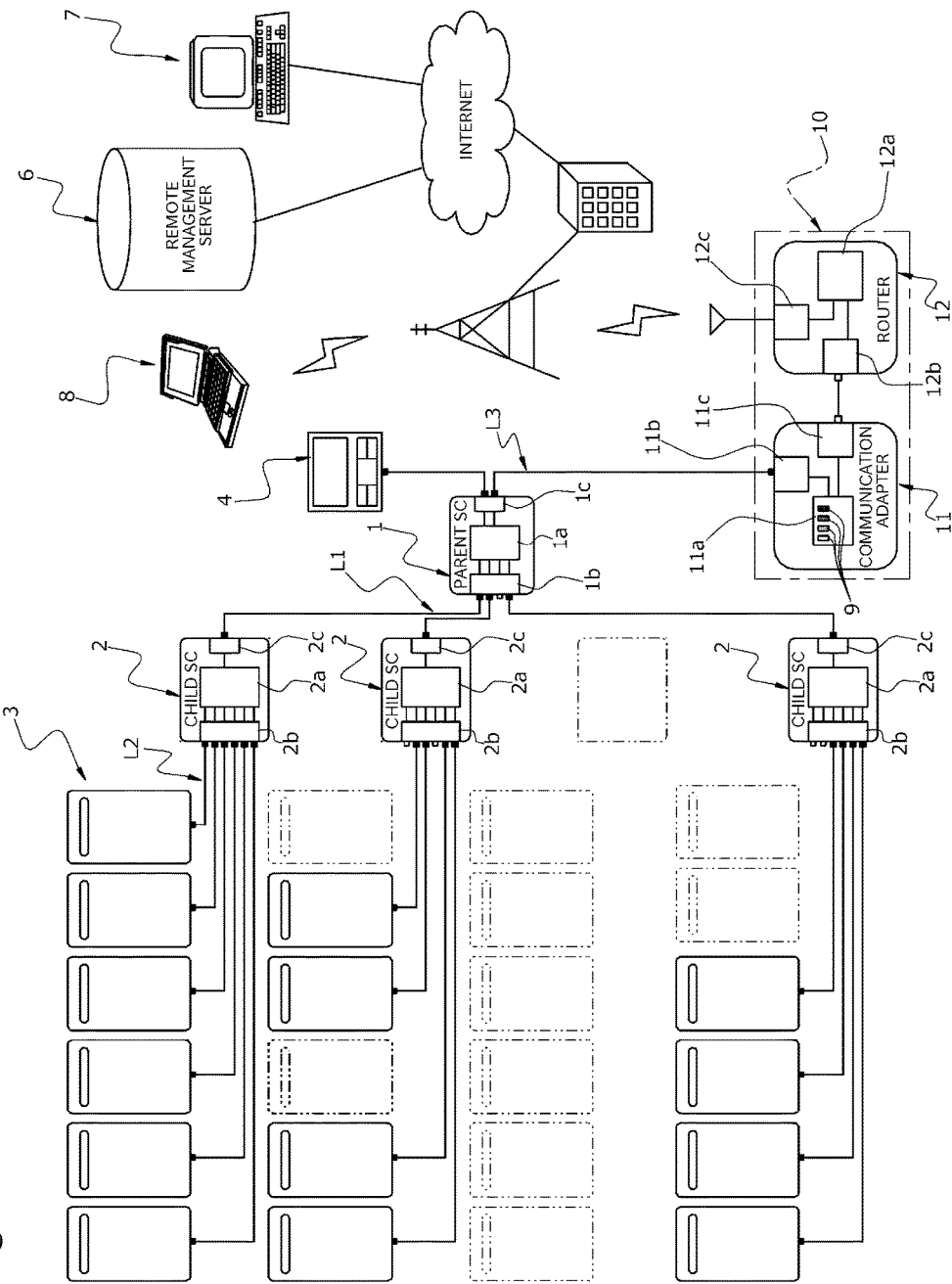
FIG. 1 shows a schematic system configuration of a multi-water-heater system including a communication apparatus and an associated remote monitoring system according to an embodiment of the present invention.

FIG. 1 shows a schematic system configuration of a multi-water-heater system, which is a system being monitored, and an associated remote monitoring system according to an embodiment of the present invention, where the multi-water-heater system according to the present embodiment includes a single highest-level system controller 1 (hereinafter referred to as "parent SC"), at most four parallel lowest-level system controllers 2 connected to the hierarchically lower-level interface of the parent SC 1 (hereinafter referred to as "child SCs"), and at most 24 water heaters 3 connected to the hierarchically lower-level interfaces of the child SCs 2, each child SC being associated with at most six water heaters, where these component devices are hierarchically connected with the parent SC 1 occupying the top and the parent and child SCs 1 and 2 control the number of operating water heaters 3. The control of the number of operating water heaters by the parent and child SCs 1 and 2 may have any details; the control of the number of operating water heaters is not limited to any particular details in the present invention, but may be as disclosed by Patent Document 1 or 2, listed above, for example.

It should be noted that the configuration shown in FIG. 1 is merely an example, and any number of child SCs 2 and any number of water heaters 3 may be connected depending on the multi-water-heater system installed in a facility or depending on the required maximum hot-water-supply capability and other factors. Further, if six or fewer water heaters 3 are provided, a system configuration is permitted in which no parent SC 1 is provided and only one child SC 2 (in this case, it may simply be referred to as SC) controls the number of operating water heaters 3. Although the configuration shown in FIG. 1 provides one level of child SCs 2 under the parent SC 1, a multi-level multi-water-heater system may be built in which each child SC 2 has further child SCs hierarchically connected thereto and provided thereunder.

According to the present embodiment, the parent SC 1 includes a control unit 1a including a microprocessor, a hierarchically lower-level two-core wire communication circuit 1b including four hierarchically lower-level connection ports for connecting to at most four lower-level child SCs 2, and a hierarchically higher-level two-core wire communication circuit 1c including a plurality of hierarchically higher-level connection ports for connecting to a plurality of higher-level devices. A child SC 2 is connected to each lower-level connection port via a communication line L1 such as a two-core wire communication line, where the parent SC 1 and child SCs are capable of exchanging various types of information (including various command signals) via the communication lines L1. Further, the control unit 1a of the parent SC 1 determines whether a child SC 2 is connected to a lower-level connection port to provide a lower-level device at a predetermined time or with predetermined timing (for example, upon start or end of hotwater-supply operation), and stores and holds connection information indicating its connection with a lower-level device that has been determined to be connected. The connection information indicating the connection of the parent SC 1 with a lower-level device that is stored and held by the control unit 1a may include 4-bit digital data indicating whether a lower-level device is connected to each of the four lower-level connection ports, for example. More specifically, it may include digital data containing "1111" if lower-level devices 2 are connected to all the four ports, "0000" if no lower-level device is connected to any of the ports, and "1101" if lower-level devices are connected to the first, second and fourth ports, as in the implementation shown.

The parent SC 1 also stores and holds predetermined device information for identifying its own device type (for example, model number or software version number). Further, the identification character indicating that it is a parent SC, "1", is stored, which is added to the above-discussed connection information such that the connection information "1 1101" is stored and held in the implementation shown. The parent SC 1, when operating, constantly monitors all the ports and updates the connection information at predetermined time intervals, for example. Further, the parent SC 1 may obtain the device information of each connected child SC 2 from this child SC 2 by communicating with the child SC 2, and store and hold this information.

Each child SC 2 includes a control unit 2a including a microprocessor, a hierarchically lower-level two-core wire communication circuit 2b including six lower-level connection ports for connecting to at most six hierarchically lower-level water heaters 3, and a hierarchically higher-level two-core wire communication circuit 2c including a higher-level connection port for connecting to a hierarchically higher-level parent SC 1, where a communication line L1 as discussed above is connected to this higher-level connection port. A water heater 3 is connected to each lower-level connection port via a communication line L2 such as a two-core wire communication line, and the child SC 2 and water heaters 3 are capable of exchanging various types of information (including various command signals) via the communication line L2. Similar to the control unit of the parent SC 1, the control unit 2a of the child SC 2 determines whether a water heater 3 is connected to each hierarchically lower-level connection port at a predetermined time or with predetermined timing, and stores and holds connection information indicating its connection with the water heaters 3 that have been determined to be connected. The connection information indicating the connection of the child SC 2 with the water heaters 3 that is stored and held may include 6-bit digital data indicating whether water heaters 3 are connected to the six lower-level connection ports, for example. More specifically, it may include digital data containing "111111" if water heaters 3 are connected to all the six ports, "000000" if no water heater is connected to any of the ports, and "011011" if water heaters are connected to the second, third, fifth and sixth ports, as is the case with the second child SC 2 from above in FIG. 1. Further, each child SC 2 stores and holds predetermined device information for identifying its own device type, and stores the identification character "0" indicating that it is a child SC, which is added to the above-discussed connection information, such that the connection information "0 011011" is stored and held by the second child SC 2 from above in FIG. 1, for example. Each of the child SCs 2, when operating, constantly monitors all of its ports and updates the connection information at predetermined time intervals, for example. Further, each of the child SCs 2 may obtain the device information of each connected water heater 3 from this water heater 3 by communicating with the water heater 3, and store and hold this information.

Each water heater 3 includes a connection port for connecting to a child SC 2, and a connection line L2, as discussed above, is connected to this connection port. Each water heater 3 also stores and holds predetermined device information for identifying its own device type. Further, each water heater 3 stores and holds information on the amount of total hot water that it has supplied and water-heater condition information including error information associated with itself and failure information associated with itself. The water-heater condition information may include other appropriate information, such as information on the type of fuel gas (e.g. town gas or propane gas) and/or information on total operation time. No lower-level systems are connected to the water heaters 3; according to the present embodiment, the water heaters 3 also store and hold connection information in the same format as the child SCs 2; more specifically, the water heaters 3 store and hold connection information containing the data "0 000000", i.e. the same data as the connection information stored and held by a child SC 2 to which no water heater 3 is connected.

Further, the multi-water-heater system according to the present embodiment includes a remote controller 4 for operating the entire system, where the remote controller 4 is connected to the hierarchically higher-level connection port on the parent SC 1 via a two-core wire communication line L3. A plurality of parallel hierarchically higher-level connection ports are provided on the parent SC 1, and a communication adapter 11 as an information collector discussed further below is connected to a hierarchically higher-level connection port on the parent SC 1 via the two-core wire communication line L3 such that the parent SC 1, remote controller 4 and communication adapter 11 are capable of communicating with each other via the communication lines L3.

The remote monitoring system is mainly composed of a remote management server 6, which is a remote management apparatus, connected to the Internet, a monitoring terminal 7 or a first display terminal provided at a call center to enable determining, for example, whether there is an error in the multi-water-heater system and arranging for servicing, a portable terminal 8 or a second display terminal carried by the maintenance technician, and a communication apparatus 10 installed at each multi-water-heater system, where the terminals 7 and 8 are communicably connected to the remote management server 6 via the Internet.

The communication apparatus 10 includes a communication adapter 11 or an information collector for communicating with the parent SC 1 of the multi-water-heater system to collect various kinds of information about the multi-water-heater system stored and held by the control unit 1a of the parent SC 1, and a router device 12, which is a communication relay unit, for relaying communication between the communication adapter 11 and remote management server 6.

The communication adapter 11 includes a control unit 11a including a microprocessor, a two-core wire communication circuit 11b for communicating with the parent SC 1, and a 10BASE-T/100BASE-TX communication circuit 11c for Ethernet (registered trademark) communication with the router device 12, and is connected in a reciprocally communicable manner to the management server 6 via the router device 12, a cell-phone communication network and the Internet and is connected in a reciprocally communicable manner to the parent SC 1 via a communication line L3 such as a two-core wire communication line. The control unit 11*a* includes a plurality of, e.g. four, LED display devices 9 which serves as a notifier, where the LED display devices 9 may preferably emit different colors, such as green, orange, red and yellow. The communication adapter 11 may be supplied with electric power by the parent SC 1 via a two-core wire communication line. The communication circuits 11*b* and 11*c* may comply with any appropriate standards.

The control unit 11*a* of the communication adapter 11 is configured to perform a predetermined communication process with the control unit 1*a* of the parent SC 1 on a regular basis (e.g., every 5 minutes) and, if there is no communication response by the parent SC 1, determines that there is an abnormality in communication between the communication adapter 11 and the parent SC 1 or the system being monitored. The control unit 11*a* of the communication adapter 11 detecting an abnormality in communication in this manner constitutes the first abnormality detection means for detecting an abnormality in communication between the communication adapter 11 and parent SC 1. If an abnormality is detected in communication between the communication adapter 11 and parent SC 1, the control unit 11*a* uses one of the LED-display-devices 9, which serves as a notifier, to perform a predetermined notification for indicating an abnormality in communication between the communication adapter 11 and parent SC 1 by, for example, causing the red LED display device to flash on and off. If the control unit 11*a* of the communication adapter 11 detects an abnormality in communication between the communication adapter 11 and parent SC 1, it transmits an error notification indicating "abnormality in two-core wire communication" to the remote management server 6.

The router device 12 includes a control unit 12*a* including a microprocessor, a 10BASE-T/100BASE-TX communication circuit 12*b* for Ethernet (registered trademark) communication with the communication adapter 11, and a 3G wireless communication circuit 12*c* for communicating with the remote management server 6. The router device 12 may be supplied with electric power by a power substrate (not shown).

The protocol for communication between the communication adapter 11 and router device 12 may be TCP/IP for example. The control unit 11*a* of the communication adapter 11 is configured to try a predetermined communication process such as an ICMP communication process on a regular basis (e.g., every one minute) and to determine whether the communication with the router device 12 is normal and, if there is no response to the ICMP communication process from the router device 12, determines that there is an abnormality in communication between the communication adapter 11 and router device 12. The control unit 11*a* of the communication adapter 11 that checks communication in this manner constitutes the second abnormality detection means for detecting an abnormality in communication between the communication adapter 11 and router device 12. If an abnormality in communication between the communication adapter 11 and router device 12 is detected, the control unit 11*a* uses one of the LED-display-devices 9, which serves as a notifier, to perform a predetermined notification indicating that there is an abnormality in communication between the communication adapter 11 and router device 12 by, for example, causing the green LED display device to flash on and off.

When the control unit 12*a* of the router device 12 has received from the communication adapter 11 a data transmission request to be sent to the remote management server 6, it transmits information attached to this request to the remote management server 6. When the remote management server 6 has received the information sent by the router device 12, it sends a predetermined normal-reception message to the router device 12. When the router device 12 has received the normal-reception message from the remote management server 6, it attaches the message to a response to the request and sends the response to the communication adapter 11. On the other hand, if the above-described communication with the remote management server 6 does not occur normally, the router attaches, to a response to the request, predetermined information indicating an abnormality in communication between the router device 12 and remote management server 6 and sends the response to the communication adapter 11. The control unit 11*a* of the communication adapter 11 is configured to determine that there is an abnormality in communication between the router device 12 and the remote management server 6 if the response from the router device 12 contains information indicating the abnormality in communication between the router device 12 and the remote management server 6. The control unit 11*a* that performs this abnormality detection process constitutes the third abnormality detection means for detecting an abnormality in communication between the router device 12 and remote management server 6. When the control unit 11*a* has detected an abnormality in communication between the router device 12 and remote management server 6, it uses one of the LED-display-devices 9, which serves as a notifier, to perform a predetermined notification indicating that there is an abnormality in communication between the router device 12 and remote management server 6 by, for example, causing the orange LED display device to flash on and off.

The remote management server 6 obtains, from the communication adapter 11 of each multi-water-heater system, system configuration information indicating the connection relationship between the water heaters 3, parent SC 1 and child SCs 2 constituting the individual multi-water-heater system to manage each multi-water-heater system, and may be a file server or a relational database server, or may take any other appropriate form. In the present embodiment, the remote management server 6 manages, for each multi-water-heater system, system configuration information in a database format that enables identification of a connection relationship between component devices connected hierarchically with the highest-level device at the top, and manages operation history information for each multi-water-heater system indicating, for example, the amount of fuel spent or the peak number of water heaters.

The monitoring terminal 7 and portable terminal 8 refer to the system configuration information managed by the remote management server 6 and are capable of displaying a tabulated list of multi-water-heater systems where errors are present, and a tabulated list of all the multi-water-heater systems, as shown in FIG. 2. Although not shown, the terminals are also capable of displaying, on the display screen, the connection relationship between the water heaters 3, parent SC 1 and child SCs 2 in a designated multi-water-heater system, in the form of a hierarchical diagram. The terminals 7 and 8 may have installed a program for referring to the system configuration information managed by the remote management server 6 and displaying the connection relationship between the component devices in a desired multi-water-heater system, or the terminals 7 and 8 may simply be display terminals, where tabulated lists or system configuration diagrams generated by the management server 6 are transmitted to the terminals 7 and 8 for display.

Further, each of the monitoring terminal 7 and portable terminal 8 is capable of issuing a configuration information acquisition request to the communication adapter 11 of a multi-water-heater system designated by a predetermined operation by a person, where the request is transmitted directly over the Internet or indirectly via the remote management server 6.

The communication adapter 11 is capable of reciprocally communicating with the parent SC 1, remote controller 4 and child SCs 2, where, when the communication adapter 11 communicates with a child SC 2, the parent SC 1 works as a relay device for communication. The communication adapter 11 assigns, to each of the system controllers 1 and 2 and each of the water heaters 3, a device ID specific to the connection location; more specifically, for example, ID01 is assigned to the connection port on the communication adapter 11, ID02 to ID05 to the first and fourth lower-level connection ports on the parent SC 1, ID06 to ID11 to the lower-level connection ports on the child SC 2 labeled ID02, ID12 to ID17 to the lower-level connection ports on the child SC 2 labeled ID03, ID18 to ID23 to the lower-level connection ports on the child SC 2 labeled ID04, and ID24 to ID29 to the lower-level connection ports on the child SC 2 labeled ID05, and the devices connected to these ports are managed using these device IDs.

Further, the control unit 11a of the communication adapter 11 determines whether the connection relationship between the parent SC 1 and child SCs 2 is normal and whether the connection relationship between the child SCs and water heaters 3 is normal based on system configuration information obtained by communicating with the parent SC 1 and child SCs 2, that is, the control unit 11a works as a connection-failure determiner.

According to an embodiment, the connection-failure determination process by the control unit 11a of the communication adapter 11 is performed as follows: a predetermined test-run initiation operation is performed on an operation unit (not shown) provided on the communication adapter 11, which initiates a test run of the communication adapter 11, during which the connection relationship is checked. Upon initiation of a test run, the control unit 11a issues a connection-information acquisition request to the system controllers 1 and 2 of the multi-water-heater system, and aggregates results in terms of communication with the system controllers 1 and 2 and information received from the system controllers 1 and 2 as a reply to acquire system configuration information about the multi-water-heater system.

An example of this system-configuration-information acquisition process will be specifically described with reference to the system configuration shown in FIG. 1. First, the control unit 11a of the communication adapter 11 issues a connection-information acquisition request to the device labeled ID01, i.e. the parent SC 1 directly connected to the communication adapter 11.

When the control unit 1a of the parent SC 1 has received the connection-information acquisition request from the communication adapter 11, it replies by sending the connection information "1 1101" that it manages to the requesting device, i.e. communication adapter 11. Before sending the connection information, it may add its own device-type information that it stores and holds.

If the control unit 11a of the communication adapter 11 receives a reply from the parent SC 1, it analyses the connection information "1 1101" from the parent SC 1 to determine that the device labeled ID01 is the parent SC 1 and lower-level devices are connected to the first, second and fourth lower-level connection ports on the parent SC 1 and no lower-level device is connected to the third lower-level connection port.

On the other hand, if the control unit 11a has received no reply from the parent SC 1 within a predetermined period of time after the issuance of the connection-information acquisition request, or if the connection information received as a reply is "1 0000", that is, if no child SC 2 is connected, then, the control unit determines that there is an abnormality in the connection relationship. If the control unit 11a of the communication adapter 11 determines that there is an abnormality in the connection relationship, it interrupts the test run, and notifies the contractor that there is an abnormality in the connection relationship using LED display devices 9 provided on the communication adapter 11 or a buzzer (not shown). It may be made distinguishable what kind of abnormality is present by changing the notification mode, for example the number of flashes or flash rate of the LED display devices or the displayed numerical character, depending on the type of abnormality. For example, in the context of the above-described example, different notification modes may be used depending on whether there is no reply from the parent SC 1 or no child SC 2 is connected.

If the connection information received as a reply is not associated with the parent SC 1, that is, if the identification character contained in the connection information is not "1", in some implementations, it may be determined that there is an abnormality in the connection relationship; in other implementations, it may be permitted to directly connect only one child SC 2 to the communication adapter 11 as necessary, and, in such implementations, the connection information received as a reply may be analyzed to determine that the device labeled ID01 is the child SC 2 and to which port of the child SC 2 a water heater 3 is connected.

If there is a reply from the parent SC 1, then, based on the connection information from the parent SC 1 as a reply, the control unit 11a of the communication adapter 11 successively issues connection information acquisition requests to all the second-level lower-level devices connected to the parent SC 1, i.e. child SCs 2 using the device IDs. In the example shown, it is known that lower-level devices are connected to the lower-level connection ports labeled ID02, ID03 and ID05; accordingly, connection information acquisition requests are issued to the lower-level devices via these lower-level connection ports of the parent SC 1.

When the control unit 2a of a child SC 2 has received a connection information acquisition request from the communication adapter 11, it replies by sending the connection information that it manages to the communication adapter 11. Again, before sending the connection information as a reply, it may add its own device-type information that it stores and holds.

If the control unit 11a of the communication adapter 11 has received a reply from a lower-level device, it analyzes the connection information in the reply and, if the connection information is "0 000000", can determine that the lower-level device is either a water heater 3 or a child SC 2 to which no water heater 3 is connected, in which case, too, it determines that there is an abnormality in the connection relationship and performs a notification similar to that described above. Further, if the identification character contained in the connection information in the reply from the lower-level device is "1", that is, if a lower-level device connected is a parent SC 1, it may be determined that there is an abnormality in the connection relationship and a notification may be made accordingly.

Further, it is also possible to determine that there is an abnormality in the connection relationship if a further lower-level system controller is connected to a lower-level communication port of the child SC 2, and to make a notification. Such a determination of whether the lower-level device connected to the child SC 2 is a system controller may be performed using device information obtained from that device. Alternatively, based on the connection information obtained from the child SC 2, a connection information acquisition request may be issued to a yet lower-level, third-level device and, if it is determined that a fourth-level device is present based on the connection information received from the third-level device as a reply, it may be determined that the lower-level device connected to the child SC 2 is a system controller.

Alternatively, after the control unit 11a of the communication adapter 11 has issued connection information acquisition requests to the child SCs 2, it may communicate with all the connected water heaters 3 to collect device information for identifying the device types of the water heaters 3 and operation condition information, discussed above, and add all this information to the system configuration information.

If no abnormality has been detected in the connection information received from the parent SC 1 and all the child SCs 2 connected thereto, a notification that the connection relationship is normal is made and, at the same time, all the received connection information is aggregated and a data transmission request addressed to the remote management server 6 containing the system configuration information about the entire multi-water-heater system is sent to the router device 12 to transmit the system configuration information to the remote management server 6 via the router device 12, and the test run is completed.

Upon completion of the test run, the control unit 11a of the communication adapter 11 initiates a regular operation and, at predetermined time intervals, e.g., every 60 minutes, communicates with the parent SC 1 to obtain system configuration information in a manner similar to the above-described test run, and sends this information to the remote management server 6. Further, the control unit 11a of the communication adapter 11 may be configured such that, during regular operation, when a configuration information acquisition request is issued from one of the terminals 7 and 8, system configuration information is transmitted to the parent SC 1 at shorter time intervals, e.g. every one minute, such that the display on the terminal 7 or 8 may be updated real-time as work progresses to change the system configuration of the multi-water-heater system. Every 60 minutes during such regular operation, or when system configuration information is to be transmitted every one minute during real-time updating, the control unit 11a of the communication adapter 11 may determine whether an abnormality has been detected in the connection section between the communication adapter 11 and rooter device 12 and determine whether an abnormality has been detected in communication between the router device 12 and remote management server 6, as discussed above, and, if such an abnormality has been detected, make a notification depending on the type of the abnormality.

The communication adapter 11 according to the above-described embodiment may accurately determine which of an abnormality in the connection section between the parent SC 1 and communication adapter 11, an abnormality in communication between the communication adapter 11 and router device 12, and an abnormality in communication between the router device 12 and remote management server 6 has occurred, and make a notification using the LED display devices 9 with different colors that depend on the location of an abnormality to enable distinction, thereby allowing the contractor, repairer or user to easily recognize the location of a failure.

Alternatively, the present invention may be configured such that the remote management server 6 determines the location of an abnormality in communication; a control configuration for such determination will be described below.

When the remote management server 6 has received an error notification indicating "abnormality in two-core wire communication" discussed above from a communication adapter 11, it determines that an abnormality has occurred in communication between the communication adapter 11 and parent SC 1 of the associated multi-water-heater system, and registers this determination as error information for this particular multi-water-heater system. The remote management server 6 performing this determination process constitutes the first abnormality determination means. If this error information has been registered, supposing that the terminals 7 and 8 display the lists shown in FIG. 2, the multi-water-heater systems in which an abnormality has occurred are displayed on the list of errors occurring, together with error code indicating an abnormality in communication between the communication adapter 11 and parent SC 1 (e.g. "X60"). The list of errors occurring only displays those multi-water-heater systems about which an error notification has been made. The list indicating how all systems are operating displays a list of information for all the multi-water-heater system.

Further, on a regular basis (e.g., every 5 minutes), the remote management server 6 performs a communication-checking process for determining whether it can normally communicate with a router device 12. This is done by, for example, sending an appropriate request, such as an ICMP message, to the router device 12 on a regular basis and determining whether a normal reply has been made. If a normal reply has not been made by the router device 12, it is determined that an abnormality has occurred in communication between the router device 12 and remote management server 6 and this determination is registered as system information for this particular multi-water-heater system. The remote management server 6 performing this determination process constitutes the third abnormality determination means for determining that there is an abnormality in communication between the router device 12 and the remote management server 6. When the information indicating an abnormality in communication between the router device 12 and remote management server 6 is registered, supposing that the terminals 7 and 8 displays the lists shown in FIG. 2, in the list of how all systems are operating, "X" is displayed in the entry of the record for this particular multi-water-heater system in the column for router connection.

Furthermore, the remote management server 6 stores the date and time when it last received system configuration information from each multi-water-heater system, where the date and time is associated with the system configuration information about the multi-water-heater system; if the absence of reception of system configuration information lasts 90 minutes or longer and the entry for router connection has "O", the server determines that an abnormality has occurred in Ethernet communication between the communication adapter 11 and router device 12 of this particular multi-water-heater system, and changes the displayed color of the entire record for this particular multi-water-heater system (for example, a red background). In the example shown in FIG. 2, the entire record for the multi-water-heater system having the system ID of "R90212" is displayed in a different color, thereby indicating occurrence of an abnormality in communication between the communication adapter 11 and router device 12 an easy-to-recognize manner.

The remote management server 6 according to the present embodiment makes it possible to remotely and accurately determine whether there is an abnormality in communication between the parent SC 1 and communication adapter 11, an abnormality in communication between the communication adapter 11 and router device 12, and an abnormality in communication between the router device 12 and remote management server 6, and easily recognize in which communication system the abnormality has occurred by using the terminals 7 and 8 to check the system configuration information managed by the remote management server 6, thereby making it possible to make accurate instructions for a repair using remote telephone-support capabilities, as well as to check more detailed system configuration information on site on a portable terminal 8 brought into the site, thereby improving the speed and quality of maintenance.

The present invention is not limited to the above-illustrated embodiments, and its design can be modified as appropriate. For example, the communication protocol used between the communication adapter 11 and the parent SC 1 and remote controller 4, the communication protocol used between the parent SC 1 and child SCs 2 and the communication protocol used between the child SCs 2 and water heaters 3 may be any appropriate protocol, but these communication protocols may be the same.

Further, the communication adapter may autonomously obtain system configuration information and transmit it to the remote management server with predetermined timing, or may obtain system configuration information and transmit it to the remote management server in response to an information acquisition request from the remote management server or other terminals.

While the communication apparatus 10 of the above-illustrated embodiment is an integral arrangement including a communication adapter 11 and a router device 12, the communication apparatus 10 may be a combination of a communication adapter 11 (information collector) and a separate router device 12 (communication relay unit) that can communicate with each other wirelessly. For example, the router device 12 may be an existing wireless LAN router in a home or facility. In such implementations, the communication circuit 11c of the communication adapter 11 incorporates a wireless LAN/cable LAN converter such that it may be connected to the router device 12 in a wirelessly communicable manner, and preferably includes wireless-LAN automatic-setting capabilities to easily establish communication between the communication apparatus 10 and router device 12 in response to a simple operation by a person.

Figure 3:
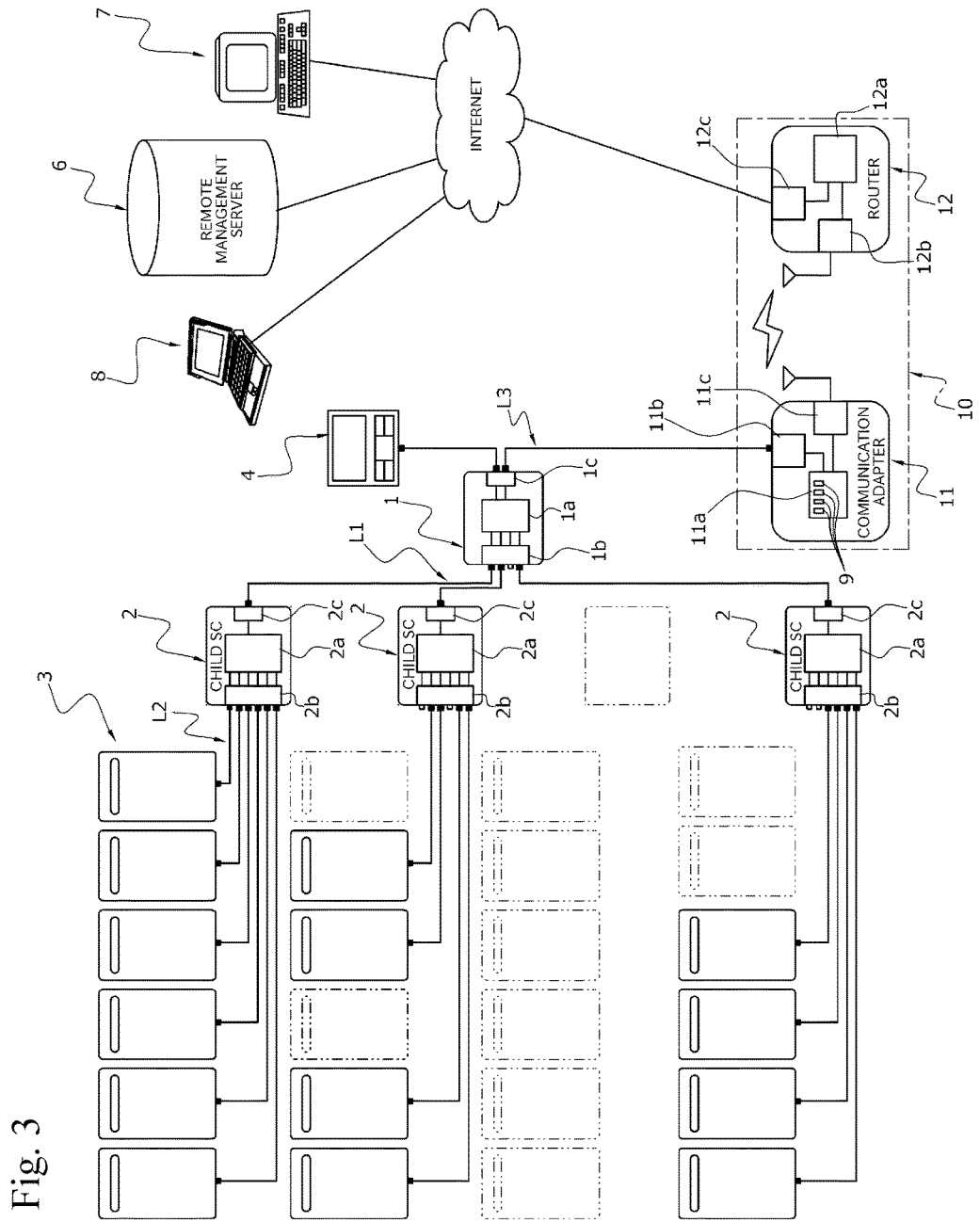
FIG. 3 shows a schematic system configuration of a multi-water-heater system including a communication apparatus and an associated remote monitoring system according to another embodiment of the present invention.

Further, according to the embodiment shown in FIG. 3, the communication circuit 12c of the router device 12 may be, for example, an optical line terminator (ONU) or terminal adapter (TA), for example, and is wire-connected to the Internet through an optical line, a telephone line, or the like. This optical line terminator or terminal adapter may be a unit separate from the router device 12.

EXPLANATION OF CHARACTERS 1 parent SC (system being monitored)
6 remote management apparatus (remote management server)
7, 8 display terminal
9 notifier
10 communication apparatus
11 information collector (communication adapter)
12 communication relay unit (router device)

The invention claimed is:

1. A communication adapter collecting information about a system being monitored by communicating with the system being monitored and communicating with a remote management apparatus via a communication relay unit, comprising:
 a first abnormality detection means adapted to detect an abnormality in communication between the communication adapter and the system being monitored;
 a second abnormality detection means adapted to detect an abnormality in communication between the communication adapter and the communication relay unit; and
 a third abnormality detection means adapted to detect an abnormality in communication between the communication relay unit and the remote management apparatus.

2. The communication adapter according to claim 1, wherein the third abnormality detection means is adapted to detect the abnormality in communication between the communication relay unit and the remote management apparatus if a response by the communication relay unit to a data transmission request addressed to the remote management apparatus contains information indicating that abnormality in communication.

3. The communication adapter according to claim 1, further comprising a notifier adapted to distinguishably indicate the abnormalities in communication detected by the first to third abnormality detection means.

4. The communication adapter according to claim 1, wherein the first abnormality detection means is configured, when it detects the abnormality in communication between the communication adapter and the system being monitored, to transmit information indicating that that abnormality in communication has occurred to the remote management apparatus.

5. A communication adapter collecting information about a system being monitored by communicating with the system being monitored and communicating with a remote management apparatus via a communication relay unit, comprising a control unit adapted to detect an abnormality in communication between the communication adapter and the system being monitored; to detect an abnormality in communication between the communication adapter and the communication relay unit; and to detect an abnormality in communication between the communication relay unit and the remote management apparatus.

6. The communication adapter according to claim 5, wherein the control unit is adapted to detect the abnormality in communication between the communication relay unit and the remote management apparatus if a response by the communication relay unit to a data transmission request addressed to the remote management apparatus contains information indicating that abnormality in communication.

7. The communication adapter according to claim 5, further comprising a notifier adapted to distinguishably indicate the abnormalities in communication detected by the control unit.

8. The communication adapter according to claim 5, wherein the control unit is configured, when it detects the abnormality in communication between the communication adapter and the system being monitored, to transmit information indicating that that abnormality in communication has occurred to the remote management apparatus.

* * * * *